United States Patent T 358/190 X 358/243

[11] 3,798,497
[45] Mar. 19, 1974

Manske

[54] SOLID-STATE TELEVISION RECEIVER WITH MAGNETICALLY REGULATED POWER SUPPLY

[75] Inventor: Hans E. Manske, Addison, Ill.

[73] Assignee: Zenith Radio Corporation, Chicago, Ill.

[22] Filed: Dec. 4, 1972

[21] Appl. No.: 312,146

[52] U.S. Cl. .......... 315/29, 323/44 R
[51] Int. Cl. .......... H01j 29/70
[58] Field of Search .......... 315/28, 29, 27 TD, 27 R, 315/20; 323/44, 60

[56] References Cited

UNITED STATES PATENTS

| | | | |
|---|---|---|---|
| 3,535,445 | 10/1970 | Griffery | 315/20 |
| 3,123,775 | 3/1964 | Leeds | 315/27 R |
| 3,237,089 | 2/1966 | Dubin et al. | 323/44 R |
| 3,519,741 | 7/1970 | Knight | 315/29 |
| 3,450,936 | 6/1969 | Knight | 315/27 R |

OTHER PUBLICATIONS

Ferency, Ferroresonant, Transformer Improves Color TV, Feb. 1970, pp. 46–47.

Operational Amplifiers, Design & Applications; Tobey et al. (1971); 288–290.

*Primary Examiner*—Richard A. Farley
*Assistant Examiner*—J. M. Potenza
*Attorney, Agent, or Firm*—John J. Pederson; N. A. Camasto

[57] ABSTRACT

An all-solid-state television receiver chassis is powered from a line-voltage-actuated power supply including a self-limiting voltage-regulating power transformer with associated solid-state rectifiers for developing all DC operating potentials required for the chassis. The combination of an all-solid-state chassis with a voltage-regulating power transformer provides substantially undegraded performance under even extremely low-line voltage conditions while preventing excessive high-voltage and X-ray generation under even extremely high-line voltage conditions, and also provides greatly improved reliability against component failure.

4 Claims, 1 Drawing Figure

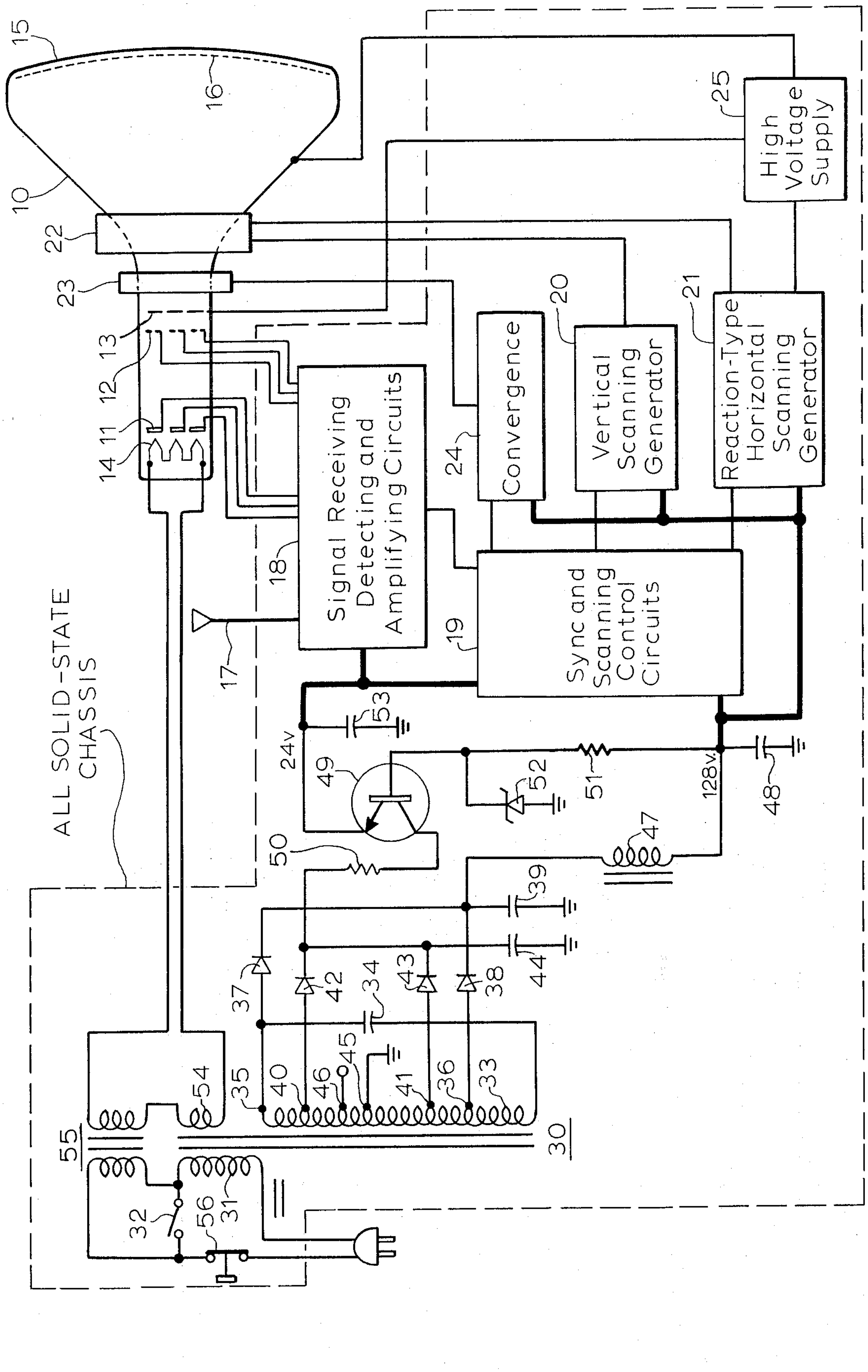
High Voltage Supply
Convergence
Vertical Scanning Generator
Reaction-Type Horizontal Scanning Generator
Signal Receiving Detecting and Amplifying Circuits
Sync and Scanning Control Circuits
ALL SOLID-STATE CHASSIS
24v
128v.

SOLID-STATE TELEVISION RECEIVER WITH MAGNETICALLY REGULATED POWER SUPPLY

BACKGROUND OF THE INVENTION

This application relates to television receivers and more particularly to such receivers of the type adapted to be energized from commercial AC power lines.

Conventional AC-operated television receivers exhibit several undesirable performance attributes. For example, under low-line voltage conditions such as those encountered during peak load periods or temporary power brown-outs imposed during times of power shortage, picture shrinkage and defocusing are encountered and under extreme brown-out conditions the receiver loses synchronization with a resultant total loss of picture intelligibility.

On the other hand, abnormally high-line voltage conditions are sometimes encountered, and this can lead to excessive high voltage and X-ray generation. In addition, either abnormally high steady state line voltage conditions or high voltage transients such as those encountered during electrical storms or during power line switching operations may subject the active devices and other components of the receiver to over-voltage stresses which can lead to excessive component failure.

It is a principal object of the present invention to provide a new and improved AC-operated television receiver having greatly improved performance characteristics in the presence of fluctuating power supply voltages.

A more specific object of the invention is to provide an AC-operated television receiver affording substantially undegraded performance under even extremely low-line voltage conditions without excessive high voltage and X-ray generation under even extremely high-line voltage conditions.

Still another and extremely important object of the invention is to provide a new and improved AC-operated television receiver having greatly improved reliability against component failure.

SUMMARY OF THE INVENTION

These and other objects are achieved, in accordance with the present invention, with a system comprising an all-solid-state television receiver chassis powered by an alternating-current-responsive low-voltage power supply comprising a self-limiting voltage-regulating power transformer. The low-voltage power supply preferably comprises full-wave solid-state rectifiers coupled to separate high-voltage and low-voltage output winding sections each symmetrically disposed with respect to a common grounded center tap, and the DC voltage generated from the high-voltage output winding section is employed to power the deflection control means associated with the image reproducer while the DC operating potential developed from the low-voltage winding section is passed through an active filter and employed to energize the signal receiving, detecting and amplifying means. Preferably, the voltage-regulating power transformer further comprises a separate secondary winding for energizing the one or more heater elements of the cathode-ray tube image-reproducing device; the provision of a magnetically regulated heater supply voltage has been found to afford greatly improved picture tube life.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in which the single FIGURE is a schematic diagram of a television receiver embodying the present invention.

DESCRIPTION OF THE PREFERRED EMBODIMENT

As illustrated in the drawing, a television receiver embodying the present invention comprises a cathode-ray tube image-reproducing device 10, here shown as a three-gun tri-color kinescope of the type employed in present-day conventional color television receivers. Thus, picture tube 10 comprises three thermionic cathodes 11, followed by respective associated control grids 12 and respective focus electrodes 13. Cathodes 11 are provided with associated heater elements 14 which are connected in series in a conventional manner. Cathode-ray tube 10 is provided with a phosphor screen 15 requiring application of a predetermined high-voltage unidirectional operating potential, typically of the order of 25 kilovolts. The conventional three-gun tri-color picture tube presently most widely employed in commercial television receivers further includes a shadow mask 16 in registry with the phosphor screen 15 and adapted to operate at a common potential with the phosphor screen. The DC operating potential required by focus electrodes 13 is conventionally much lower than the operating voltage required by phosphor screen 15 and mask 16, and may typically be of the order of 600 to 1,000 volts.

The receiver shown in the drawing further comprises an all-solid-state chassis for actuating image-reproducing device 10 to develop television pictures. Broadcast television picture signals are intercepted by an antenna 17 and processed by signal receiving, detecting and amplifying circuits 18 to provide suitable luminance and chrominance signals to cathodes 11 and control grids 12 of picture tube 10. Composite video signals from the signal receiving, detecting and amplifying circuits 18 are further supplied to sync and scanning control circuits 19 where the vertical and horizontal synchronizing components are extracted and subsequently employed to control vertical and horizontal scanning generators 20 and 21 respectively. Scanning generators 20 and 21 supply appropriate vertical and horizontal sweep currents to a conventional deflection yoke 22 associated with picture tube 10. Dynamic convergence is also provided by means of a convergence yoke 23 mounted on the neck of picture tube 10 and controlled by conventional convergence circuitry 24 which in turn is operated under control of appropriate horizontal and vertical synchronizing components from sync and scanning control circuits 19. Horizontal scanning generator 21 is a reaction-type scanning generator which is coupled in turn through the usual horizontal sweep transformer (not shown) to a high-voltage supply 25 for generating the final anode voltage (typically of the order of 25 KVDC) for application to the phosphor screen 15 of picture tube 10; high-voltage supply 25 typically also includes a step-down circuit for developing the required lower unidirectional operating potential for application to focus electrodes 13. Horizontal scanning generator 21 may also include a conventional bootstrap circuit for developing B-boost voltage (e.g., 250 volts) for application to selected receiver stages such as the video output stage.

As thus far described, the receiver may be of entirely conventional construction and may further include sound detecting, amplifying and reproducing apparatus (not shown), as well as additional signal processing and controlling circuits and systems such as a VHF/UHF tuner, and AGC (automatic gain control) system, and an automatic frequency control system for the tuner, all of which have been omitted to avoid unduly encumbering the drawing. The only limitations placed on the television receiver chassis in accordance with the present invention are that it be of all-solid-state construction, i.e., that only transistors and integrated circuits and solid-state diodes are employed as active elements rather than vacuum tubes, and that the horizontal scanning generator and high voltage supply be of the reaction type with the final anode voltage for the picture tube being developed by rectification of stepped-up flyback pulses generated across a step-up winding of the horizontal sweep transformer.

Further in accordance with the invention, the all-solid-state TV receiver chassis includes an alternating-current-responsive low-voltage power supply comprising a self-limiting voltage-regulating power transformer 30. Power transformer 30 is provided with an input primary winding 31 connected through the main on/off switch 32 of the receiver to a conventional line cord and AC plug adapted for connection to the commercial power lines. Transformer 30 further comprises a principal secondary winding 33 which is tuned by means of a parallel-connected condenser 34 to the AC power line frequency (conventionally 60 Hertz). Principal secondary winding 33 includes a high-voltage output winding section, between one terminal 35 and a tap 36 on winding 33, across which is connected a full-wave solid-state rectifier comprising solid-state diodes 37 and 38 and a storage capacitor 39. Winding 33 is further provided with two additional taps 40 and 41 defining a low-voltage output winding section across which is connected solid-state full-wave rectifier means including additional solid-state diodes 42 and 43 and a storage capacitor 44. High-voltage output winding section 35–36 and low-voltage output winding section 40–41 are symmetrically wound relative to a common grounded center tap 45. An additional tap 46 is provided for connection to a pilot light terminal for the receiver.

The low-voltage power supply comprising voltage-regulating power transformer 30 provides unidirectional operating potentials at different levels across storage condensers 39 and 44. Typically these voltages may be 128 volts and 33 volts DC respectively. The higher of the two unidirectional operating potentials, appearing across storage capacitor 39, is filtered by means of a series choke 47 and a shunt capacitor 48 to provide a filtered 128 volt operating DC potential for the vertical and horizontal scanning generators 20 and 21 and convergence circuits 24.

The lower of the DC operating potentials developed by the low-voltage power supply, appearing across storage capacitor 44, is passed through an active filter comprising a transistor 49 operating with inverse beta as a collector-driven emitter follower. The unfiltered DC output voltage generated across storage capacitor 44 is applied through a series resistor 50 to the collector of transistor 49, and its base is connected through another resistor 51 to the 128 volt terminal and stabilized by shunt-connected Zener diode 52. The emitter of transistor 49 is used as an output terminal and connected to a high-frequency filter capacitor 53 which serves as a source of 24 volt DC operating potential for signal receiving, detecting and amplifying circuits 18.

Voltage-regulating power transformer 30 is also provided with a separate secondary winding 54 which is connected across heater elements 14 of picture tube 10 and serves as a source of regulated AC energizing potential for heater elements 14. Preferably, as shown, an additional low-voltage transformer 55 is provided, for the purpose of maintaining heater elements 14 in a partially energized state at all times to afford instant-play operating on closing of main switch 32. The construction and operation of the instant-play circuit is described and claimed in the copending application of Leonard Dietch, Ser. No. 255,350, filed May 22, 1972, entitled INSTANT PLAY TELEVISION RECEIVER WITH CONSTANT VOLTAGE TRANSFORMER, and assigned to the same assignee as the present application; in brief, however, the auxiliary transformer 55 maintains an AC voltage of reduced magnitude across heater elements 14 with main on/off switch 32 open but it is cut out of the circuit on closing switch 32, whereupon separate secondary winding 54 of the voltage-regulating power transformer 30 becomes the sole source of energizing current for heater elements 14.

The use of double-diode full-wave rectifiers provides an important advantage in minimizing power losses and thus permitting the use of smaller, lighter-weight power transformer constructions for a given power handling capability than can be used with bridge rectifiers or other types of rectifiers in which losses are aggravated by the greater DC output resistance exhibited by two or more rectifier devices in series. Transformer size and weight are also kept small by the use of a single output winding with the different winding sections symmetrically disposed with respect to a common center tap.

In accordance with another feature of the invention, the high-voltage regulator conventionally associated with high-voltage supply 25 is eliminated, and the only regulation of high-voltage supply 25 is the magnetic regulation provided by voltage-regulating power transformer 30. This provides greatly improved cost effectiveness for the system and actually provides sufficient economy of parts to permit an effective overall cost saving despite the more expensive construction of voltage-regulating power transformer 30 as compared with conventional unregulated power transformers.

In accordance with still another feature of the present invention, a delayed action circuit breaker 56 is provided in series with primary winding 31 of voltage-regulating power transformer 30. Circuit breaker 56 protects transformer 30 from overheating in the event of sustained application of extremely high operating voltages even above the maximum limit of the normal design range. Thus, if the line voltage should rise above 140 volts and be sustained for a period in excess of 5 to 10 seconds, circuit breaker 56 opens automatically to protect transformer 30 from overheating. Normal operation can later be restored when the line voltage returns to normal levels by simply resetting circuit breaker 56. Thus, all of the receiver components are protected from steady state and transient over-voltage conditions by the magnetic regulation of voltage-regulating power transformer 30, and the power transformer itself is protected from overheating under extreme over-voltage conditions by the provision of circuit breaker 56.

Experience with the system of the present invention has established numerous performance advantages as compared with prior AC-operated television sets employing either unregulated or electronically regulated low-voltage power supplies. Principal advantages of the all-solid-state television receiver with magnetic power regulation, embodying the invention, include the following:

1. Substantially undegraded performance during power brown-outs and at peak load times with resulting low-line voltage conditions. Specifically, stable picture operation is maintained at line voltages of 100 volts, 90 volts, or even lower. In contrast, TV receivers with unregulated or electronically regulated low-voltage power supplies typically produce substantial picture shrinkage and degradation at line voltages below 100 volts, and at even lower voltages picture synchronization is lost and then the receiver drops out of operation altogether.
2. Greatly increased reliability and prolonged life for the TV receiver and its critical components. Power surges and transients are greatly attenuated before reaching critical receiver components, especially integrated circuits, by the self-limiting action of the voltage-regulating power transformer. Experience shows that overall receiver reliability as reflected in the number of receiver failures per 100 receivers at 500, 1,000, 2,000, 4,000 or even more hours is greater than that of similar receivers using unregulated or electronically regulated low-voltage power supplies, by a factor of at least 2 to 1.
3. Provision of a separate secondary winding on the voltage-regulating power transformer for picture tube heater supply greatly increases picture tube life. Even small changes in heater voltage, and thus in heater current, result in substantial variations in cathode temperature. Cathode overheating results in premature exhaustion of the emissive material; on the other hand, insufficient heating results in cathode poisoning from residual gas molecules. By using a separate output secondary winding for the voltage-regulating power transformer, in accordance with a feature of the present invention, the heater voltage is maintained substantially constant at its optimum level despite large variations in power line voltage; present indications are that picture tube life is at least doubled under frequently encountered high-line-voltage operating conditions, e.g., 125–130 volts. Somewhat smaller improvements in picture tube life may be expected at normal and low line-voltage operating conditions.
4. Elimination of X-ray emission possibilities. X-rays may be produced when picture tube final anode voltages reach levels above 30 kilovolts. With the system of the present invention, line voltage and current surges are prevented by the self-limiting action of the voltage-regulating power transformer from affecting the high-voltage applied to the picture tube final anode. Moreover, the system of the invention is fail-safe from the point of view that under no circumstances can line voltage conditions or power surges cause the picture tube final anode voltage to exceed the threshold for harmful X-ray production.

Thus the present invention provides a new and greatly improved AC-operated television receiver with stabilized picture performance over widely varying line voltage conditions and with greatly improved life and reliability at reduced cost. The overall system comprising an all-solid-state TV receiver chassis powered by a self-limiting voltage-regulating power transformer rather than an unregulated or electronically regulated low-voltage power supply establishes a new standard for reliability and extended life for both picture tube and receiver chassis while at the same time providing dramatically superior operating performance under low line voltage conditions.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A television receiver providing substantially undegraded performance under even extremely low line-voltage conditions without excessive high-voltage and X-ray generation under even extremely high line voltage conditions, and having greatly improved reliability against component failure, said receiver comprising:

a cathode-ray tube image-reproducing device having one or more thermionic cathodes with one or more associated heater elements, a phosphor screen requiring application of a predetermined unidirectional operating voltage, and focus electrode means requiring a unidirectional operating potential lower than the operating voltage required by said phosphor screen;

an all-solid-state chassis for actuating said image-reproducing device to develop television pictures, said chassis comprising a. signal receiving, detecting and amplifying means for applying television picture signals to said image-reproducing device, b. deflection control means associated with said image-reproducing device for effecting electron beam scansion of said phosphor screen, and including a reaction-type scanning generator and high-voltage supply for generating said unidirectional operating voltage for application to said phosphor screen and said unidirectional operating potential for application to said focus electrode means, and c. an alternating-current-responsive low-voltage power supply comprising a self-limiting voltage-regulating power transformer having an output secondary winding tuned to the line-voltage power supply frequency and provided with high-voltage and low-voltage output winding sections each symmetrically disposed relative to a, grounded center tap, a first full-wave rectifier comprising a pair of solid-state diodes coupled to said high-voltage winding section to provide a first DC operating potential, a second full-wave rectifier comprising a pair of solid-state diodes coupled to said second output winding section to provide a second DC operating potential at a voltage level lower than said first DC operating potential, means for using said first DC operating potential for energizing said deflection control means, and means for using said second DC operating potential for energizing said signal receiving, detecting and amplifying means.

2. A television receiver according to claim 1, in which said voltage-regulating power transformer further comprises a separate secondary winding for energizing said one or more heater elements of said image-reproducing device with a regulated AC voltage.

3. A television receiver according to claim 1, which further comprises an active filter coupled to said second full-wave rectifier.

4. A television receiver according to claim 1, in which the only regulation of said high-voltage supply is the magnetic regulation provided by said voltage-regulating power transformer.

* * * * *